United States Patent
Seth et al.

(10) Patent No.: US 11,121,964 B2
(45) Date of Patent: Sep. 14, 2021

(54) DATA PATH RETENTION DURING CONTROL PLANE FAILURES IN A MULTIPROTOCOL LABEL SWITCHING NETWORK

(71) Applicant: Ciena Corporation, Hanover, MD (US)

(72) Inventors: Deepak Seth, Gurgaon (IN); Rahul Kumar Barche, Gurgaon (IN); Bhartendu Maheshwari, Gurgaon (IN); Jasnam Singh, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 94 days.

(21) Appl. No.: 16/159,845

(22) Filed: Oct. 15, 2018

(65) Prior Publication Data

US 2020/0076726 A1    Mar. 5, 2020

(30) Foreign Application Priority Data

Aug. 31, 2018  (IN) .............................. 201811032768

(51) Int. Cl.
| | | |
|---|---|---|
| *H04L 12/24* | (2006.01) | |
| *H04L 12/26* | (2006.01) | |
| *H04L 12/703* | (2013.01) | |
| *H04L 12/723* | (2013.01) | |
| *H04L 12/911* | (2013.01) | |
| *H04L 12/931* | (2013.01) | |

(52) U.S. Cl.
CPC .......... *H04L 45/28* (2013.01); *H04L 41/0663* (2013.01); *H04L 43/0811* (2013.01); *H04L 43/10* (2013.01); *H04L 45/50* (2013.01); *H04L 47/746* (2013.01); *H04L 49/70* (2013.01)

(58) Field of Classification Search
USPC ................. 709/220–224, 227–229, 238–239
See application file for complete search history.

(56) References Cited

U.S. PATENT DOCUMENTS

| | | | | |
|---|---|---|---|---|
| 2002/0156888 | A1* | 10/2002 | Lee ..................... | H04L 41/0869 709/224 |
| 2008/0056121 | A1* | 3/2008 | Tsai ....................... | H04L 45/28 370/216 |
| 2008/0219268 | A1* | 9/2008 | Dennison ............... | H04L 45/22 370/395.2 |
| 2012/0182885 | A1* | 7/2012 | Bradford ................ | H04L 45/16 370/252 |

(Continued)

OTHER PUBLICATIONS

MEF Technical Specification, MEF 6.2, EVC Ethernet Services Definitions Phase 3, Aug. 2014, pp. 1-74.

*Primary Examiner* — Younes Naji
*Assistant Examiner* — Da T Ton
(74) *Attorney, Agent, or Firm* — Clements Bernard Walker; Lawrence A. Baratta, Jr.; Christopher L. Bernard

(57) ABSTRACT

Systems and methods for data path retention during control plane failures in a Multiprotocol Label Switching (MPLS) network include, in a network element, operating an MPLS service on a data path in the MPLS network in an initial stage with both a control plane and a data plane operating normally; responsive to a failure affecting only the control plane, switching the MPLS service to an Ethernet Line (ELINE) service which is configured on the data path; and, responsive to a recovery of the control plane, switching the ELINE service back to the MPLS service.

17 Claims, 6 Drawing Sheets

(56) References Cited

U.S. PATENT DOCUMENTS

| | | | |
|---|---|---|---|
| 2013/0088953 A1* | 4/2013 | Zhao | H04L 45/22 370/218 |
| 2014/0064062 A1* | 3/2014 | Taillon | H04L 45/50 370/225 |
| 2015/0195178 A1* | 7/2015 | Bhattacharya | H04L 45/745 718/1 |
| 2015/0326427 A1* | 11/2015 | Ali | H04L 41/0668 370/228 |
| 2016/0036694 A1* | 2/2016 | Abdul | H04L 43/10 370/244 |
| 2016/0050119 A1 | 2/2016 | Chhabra et al. | |
| 2017/0118066 A1* | 4/2017 | Mathew | H04L 41/20 |
| 2019/0394066 A1* | 12/2019 | Lin | H04L 45/28 |

* cited by examiner

DATA PATH RETENTION DURING CONTROL PLANE FAILURES IN A MULTIPROTOCOL LABEL SWITCHING NETWORK

FIELD OF THE DISCLOSURE

The present disclosure generally relates to networking. More particularly, the present disclosure relates to data path retention systems and methods during control plane failures in a Multiprotocol Label Switching (MPLS) network.

BACKGROUND OF THE DISCLOSURE

Networks can include a control plane and a data plane. The control plane is configured to make decisions about where traffic is sent; includes the exchange of control packets or Protocol Data Units (PDUs); performs functionality related to configuration, management, and the exchange of routing information; etc. That is, the control plane can be viewed as the signaling aspect of a network. The data plane is also known as a forwarding plane and includes forwarding traffic to a next hop along a path to a selected destination, as directed by the control plane. Multiprotocol Label Switching (MPLS) directs data from one network node to the next based on short path labels rather than long network addresses, avoiding complex lookups in a routing table. The control plane in MPLS includes various routing protocols, label distribution protocols, etc.

There are various instances where traffic is down due to a control plane or routing protocol failure. Conventionally, control plane failures are treated equivalent to data plane failures. There are various protection schemes focused on rerouting traffic via alternate paths, which of course consume additional network resources. From an operational perspective, control plane or routing protocol failures are challenging especially when an operator wants to stick to a specific path for various reasons (e.g., security, etc.), e.g., unprotected static tunnels or sticky co-routed tunnels in MPLS. While, conventional protection schemes can be used to protect from control plane or routing protocol failures, these schemes require alternative routes which are undesirable for unprotected static tunnels or sticky co-routed tunnels. Further, these conventional protection schemes require additional network paths and resources to address control plane or routing protocol failures.

BRIEF SUMMARY OF THE DISCLOSURE

In an embodiment, a method for data path retention during control plane failures in a Multiprotocol Label Switching (MPLS) network includes, in a network element, operating an MPLS service on a data path in the MPLS network in an initial stage with both a control plane and a data plane operating normally; responsive to a failure affecting only the control plane, switching the MPLS service to an Ethernet Line (ELINE) service which is configured on the data path; and, responsive to a recovery of the control plane, switching the ELINE service back to the MPLS service. A Connectivity Fault Management (CFM) UP Maintenance End Point (MEP) can be configured between a port of the network element and an associated port of an egress network element at an opposite end of the data path. The network element can be configured to detect the failure based on Continuity Check Messages (CCMs) received on the CFM UP MEP. The CCMs can be blocked on the ELINE service, utilizing an Access flow, responsive to the failure. The MPLS service and the ELINE service can both be connected to a Virtual Switch (VS) and associated ports of the VS are blocked and unblocked utilizing Virtual Link Loss Indication (VLLI) and inverse VLLI (iVLLI) based on a state of the control plane. The MPLS service can be one of an unprotected static tunnel and a sticky co-routed tunnel, over the data path which is a Label Switched Path (LSP). The failure can be due to any of Media Access Control (MAC) resolution using Address Resolution Protocol (ARP); a routing protocol convergence/failure in one of Intermediate System-Intermediate System (ISIS) and Open Shortest Path First (OSPF); an Operations, Administration, and Maintenance (OAM) Bidirectional Fault Detection (BFD) failure; a tunnel signaling message failure in one of Resource Reservation Protocol (RSVP) and Constraint-based Routing Label Distribution Protocol (CR-LDP); and a Pseudowire (PW) signaling message failure.

In another embodiment, a network element configured for data path retention during control plane failures in a Multiprotocol Label Switching (MPLS) network includes one or more line modules with associated ports; a switching fabric interconnecting the associated ports; and a controller communicatively coupled to the one or more line modules and the switching fabric, wherein an MPLS service is operated on a data path via a port connected to the MPLS network in an initial stage with both a control plane and a data plane operating normally, responsive to a failure affecting only the control plane, the MPLS service is switched to an Ethernet Line (ELINE) service which is configured on the data path, and, responsive to a recovery of the control plane, the ELINE service is switched back to the MPLS service. A Connectivity Fault Management (CFM) UP Maintenance End Point (MEP) can be configured between a port of the network element and an associated port of an egress network element at an opposite end of the data path. The network element can be configured to detect the failure based on Continuity Check Messages (CCMs) received on the CFM UP MEP. The CCMs can be blocked on the ELINE service, utilizing an Access flow, responsive to the failure. The MPLS service and the ELINE service can both be connected to a Virtual Switch (VS) and associated ports of the VS are blocked and unblocked utilizing Virtual Link Loss Indication (VLLI) and inverse VLLI (iVLLI) based on a state of the control plane. The MPLS service can be one of an unprotected static tunnel and a sticky co-routed tunnel, over the data path which is a Label Switched Path (LSP). The failure can be due to any of Media Access Control (MAC) resolution using Address Resolution Protocol (ARP); a routing protocol convergence/failure in one of Intermediate System-Intermediate System (ISIS) and Open Shortest Path First (OSPF); an Operations, Administration, and Maintenance (OAM) Bidirectional Fault Detection (BFD) failure; a tunnel signaling message failure in one of Resource Reservation Protocol (RSVP) and Constraint-based Routing Label Distribution Protocol (CR-LDP); and a Pseudowire (PW) signaling message failure.

In a further embodiment, a Multiprotocol Label Switching (MPLS) network configured for data path retention during control plane includes a plurality of nodes interconnected to one another; wherein an MPLS service is configured between two Label Edge Routers (LERs) of the plurality of nodes via a data path and the MPLS service is in an initial stage with both a control plane and a data plane operating normally, wherein, responsive to a failure affecting only the control plane, the MPLS service is switched to an Ethernet Line (ELINE) service which is configured on the data path, and wherein, responsive to a recovery of the control plane, the ELINE service is switched back to the MPLS service. A Connectivity Fault Management (CFM) UP Maintenance End Point (MEP) can be configured between a port of the network element and an associated port of an egress network element at an opposite end of the data path. The network element can be configured to detect the failure based on Continuity Check Messages (CCMs) received on the CFM UP MEP. The CCMs can be blocked on the ELINE service, utilizing an Access flow, responsive to the failure. The MPLS service and the ELINE service can both be connected to a Virtual Switch (VS) and associated ports of the VS are blocked and unblocked utilizing Virtual Link Loss Indication (VLLI) and inverse VLLI (iVLLI) based on a state of the control plane. The MPLS service can be one of an unprotected static tunnel and a sticky co-routed tunnel, over the data path which is a Label Switched Path (LSP).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to data path retention systems and methods during control plane failures in a Multiprotocol Label Switching (MPLS) network. The systems and methods utilize existing Layer 2 protocols to provide protection where an existing path cannot be used for data forwarding such as due to a control plane or routing protocol failure. The protection is provided on a same path as the primary tunnel, satisfying the requirements of unprotected static tunnels or sticky co-routed tunnels. The systems and methods can include a pre-configured ELINE (Ethernet Line as defined by the Metro Ethernet Forum (MEF) for connecting two User-Network Interface (UNI) ports) service for use in the case of a control plane failure in an MPLS environment. The ELINE service can be used for critical data handling on the same path using proactive characteristics of Connectivity Fault Management (CFM)/Virtual Link Loss Indication (VLLI). The ELINE service can be used to provide an alternate transport medium responsive to a control plane failure in MPLS. There are modifications to existing protocols and behaviors, e.g., VLLI/inverse VLLI (iVLLI) are capable of performing operations such as to shut and un-shut any port, and these are configured with two additional operations—block and unblock of sub-ports, which is similar to a Ring Protection Link (RPL) block/unblock operation in G.8032.

The systems and methods overcome the unnecessary and complete traffic outage over unprotected static and sticky dynamic co-routed tunnels, while there is no link failures or connectivity issue on the data path, but where there are control plane or routing failures. For some networks or applications, e.g., finance, defense, etc., it may not be recommended to forward traffic through alternative paths, but there is a need to attend to control plane failures to minimize data traffic outage. In networks where a control plane failure occurs, and the operator is bound to provision a protected path, this approach would be highly beneficial. This would save network resources by not using or occupying another permanent backup path.

In conventional protection in MPLS, equal treatment is given to control plane and data plane failure conditions, i.e., both require a connection to be rerouted. The systems and methods distinguish control plane failures where the data plane is still in operation and provides an ability to protect a tunnel to retain the same path. Of note, there is no additional or complex enhancement required in existing protocol stacks, which means the systems and methods could be implemented at little or no cost in terms of hardware, resources, etc.

Network

Figure 1:
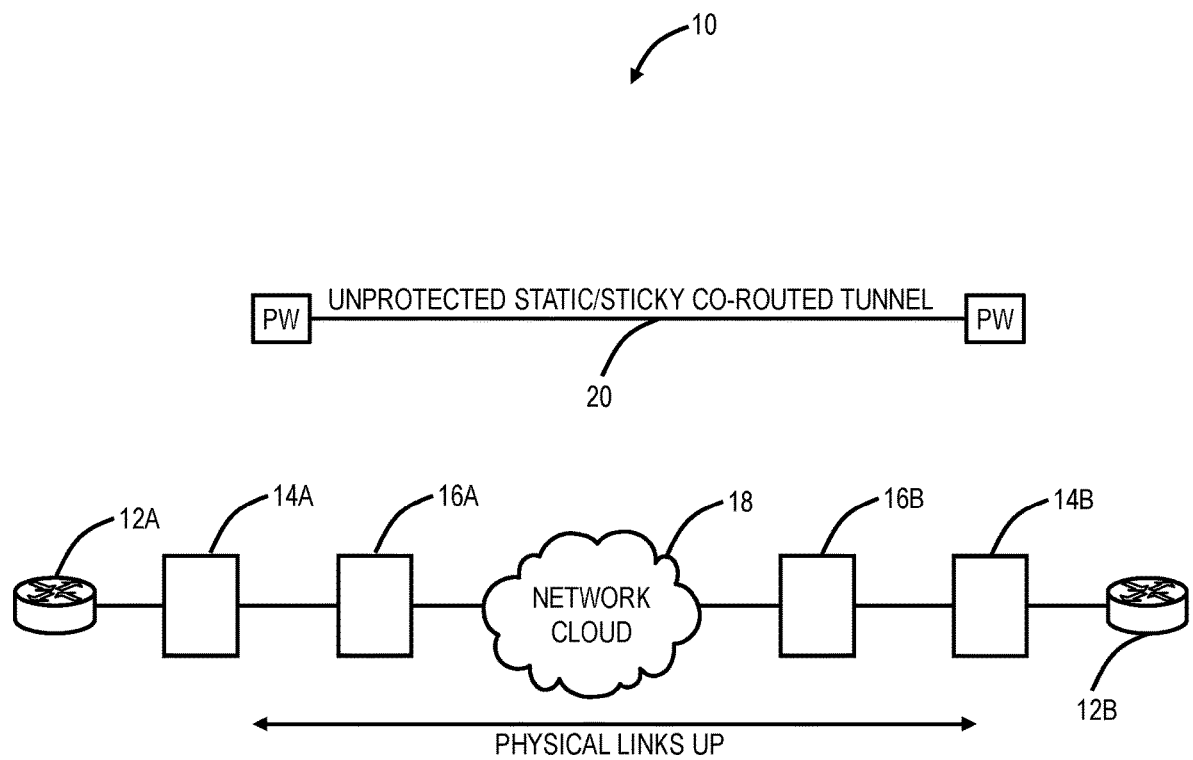
FIG. 1 is a network diagram of an example Multiprotocol Label Switching (MPLS) network.

FIG. 1 is a network diagram of an example MPLS network 10. The MPLS network 10 includes two Customer Premises Equipment (CPE) routers 12A, 12B interconnected through the MPLS network 10. The MPLS network 10 includes network elements 14A, 14B, 16A, 16B as well as other possible network elements/nodes represented by a network cloud 18. In an example, the MPLS network 10 can include a tunnel 20 interconnecting the CPE routers 12A, 12B via the network elements 14A, 14B. The tunnel 20 can be an unprotected static tunnel or a stick co-routed tunnel which as described herein remains on the selected path. The network elements 14A, 14B are Label Edge Routers (LER) and the network elements 16A, 16B are Label Switched Routers (LSR).

The MPLS network 10 is presented herein for illustration purposes, and those of ordinary skill in the art will recognize other deployments can include additional network elements, fewer network elements, different topologies, etc. Within the MPLS network 10, each LSR is configured to forward traffic along Label Switched Paths (LSPs) between the LERs. MPLS is used in the MPLS network 10 to reduce the number of lookups performed at the various network elements 14, 16. For example, a packet can be received by the head end LER of a LSP which conventionally performs a lookup to determine which label should be pushed onto the packet to switch the packet onto an LSP to the next hop through the MPLS network 10 to reach its destination. When the packet arrives at intermediary LSRs, the LSR will read the MPLS label and replace the MPLS label with a new MPLS label. MPLS thus allows a single route lookup to be performed at the edge of the MPLS network 10 and allows label switching to be used instead of lookups to forward the packet across the MPLS network 10.

In the MPLS network 10, there can be instances where the tunnel 20 is down due to control plane or routing protocol failures. Again, as described herein, these failures are challenging to handle, especially when the tunnel 20 is required to remain on the specific path for a variety of reasons, for example, unprotected static or sticky co-routed tunnels in MPLS. To protect these control plane or routing protocol failures, the systems and methods utilize existing Layer 2 protocols to provide an approach where the existing path can be retained for data forwarding in cases where there are control plane or routing protocol failures, but the data plane is operational.

Control Plane Failures

Some examples of control plane issues can include Media Access Control (MAC) resolution failures using Address Resolution Protocol (ARP); routing protocol convergence/failures—Intermediate System-Intermediate System (ISIS), Open Shortest Path First (OSPF), etc.; Operations, Administration, and Maintenance (OAM) Bidirectional Fault Detection (BFD) failures; tunnel signaling message failures—Resource Reservation Protocol (RSVP), Constraint-based Routing Label Distribution Protocol (CR-LDP), etc.; Pseudowire (PW) signaling message failures—Status Type Length Value (TLV), Targeted Label Distribution Protocol (T-LDP), etc. If there is a control plane or routing protocol failure and there are no failures in the data path (network interfaces or links), traffic could still be successfully forwarded, on the same path as the tunnel 20, with the systems and methods described herein.

Existing Layer 2 Protocols

Figure 2:
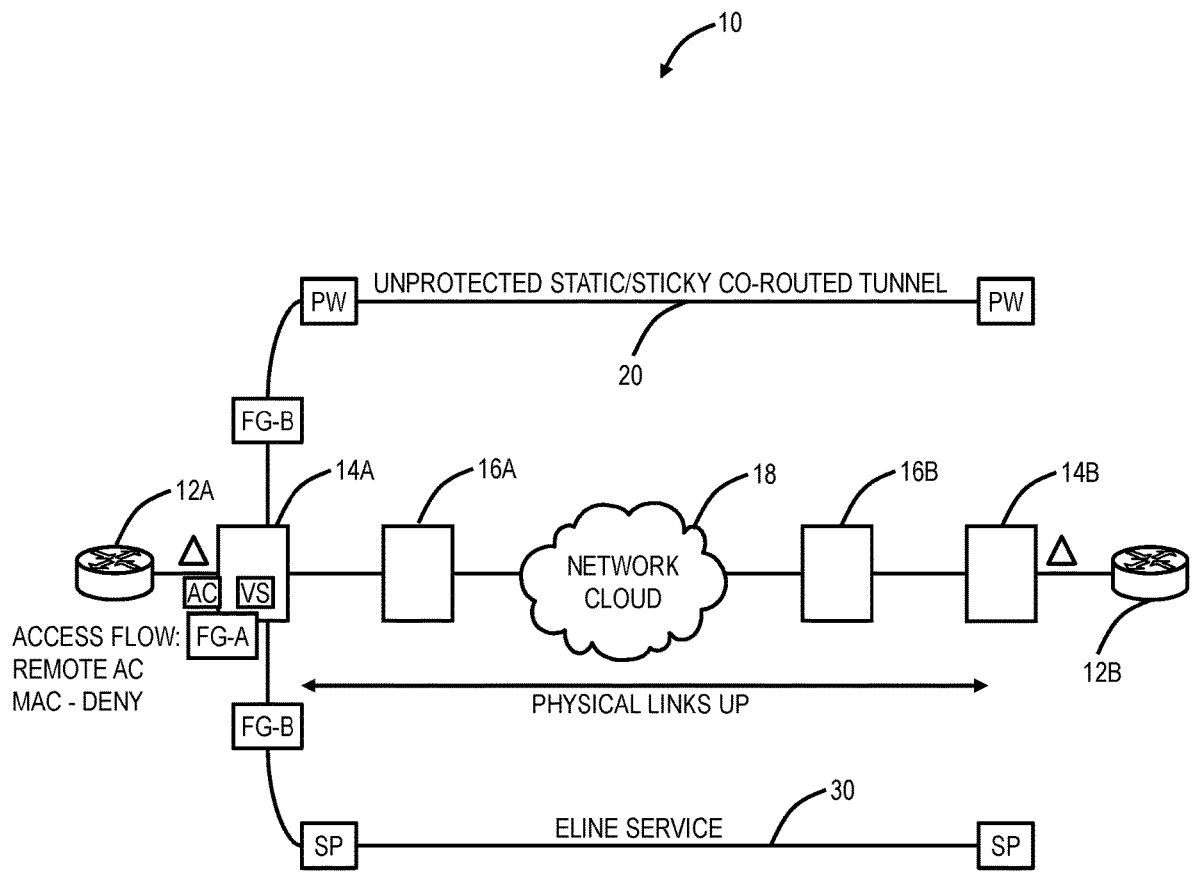
FIG. 2 is a network diagram of the example MPLS network of FIG. 1 with a pre-configured ELINE service configured to protect a tunnel over the same path in the event of control plane or routing protocol failures affecting the tunnel.

FIG. 2 is a network diagram of the example MPLS network 10 with a pre-configured ELINE service 30 configured to protect the tunnel 20 over the same path in the event of control plane or routing protocol failures affecting the tunnel 20. The following protocols are used in the systems and methods described herein.

Multiprotocol Label Switching (MPLS) provides a label switching approach to forward packets through the MPLS network 10. In label switching, a packet is assigned a label and is forwarded along a predetermined path of routers. There are many kinds for MPLS tunnels available, but the systems and methods relate to fixed path MPLS services, for example, co-routed static unprotected tunnels and Dynamic Co-Routed Tunnels (DCRT) with the sticky option enabled. In these cases, RSVP-Traffic Engineering (TE) and/or T-LDP protocols are used to establish the data path.

Connectivity Fault Management (CFM) provides a mechanism to continuously monitor end-to-end network connectivity of a network service, such as a Virtual Switch (VS). Services can be monitored over a single hop, a point-to-point link, or over multiple hops, using equipment managed by one or more service providers and operations entities. The CFM can be between two Maintenance End Points (MEP) such as a UP MEP (network-facing).

Virtual Link Loss Indicator (VLLI) and inverse VLLI (iVLLI) perform port conditioning when a failure occurs at a far-end client port of an Ethernet Virtual Circuit (EVC) or in the data path between the client ports of an EVC. The VLLI action performed as part of port conditioning is the inverse of that performed for iVLLI. When a fault occurs, VLLI performs a port-shut action whereas iVLLI performs a port-unshut action. Upon recovery, VLLI performs a port-unshut action whereas iVLLI performs a port-shut action.

Access flow provides security for MAC Protocols that flow within a network element. Incoming frames would be compared to an Access flow, and a configured action (permit/deny) is taken.

Private forwarding groups (PFG) provide a way to restrict communications between interfaces that attach to the same virtual switch. Each virtual switch can support two private forwarding groups, A and B. Interfaces that belong to the same private forwarding group follow the same forwarding policy. The forwarding policy controls forwarding between private forwarding groups.

ELINE is defined in MEF 6.2 "EVC Ethernet Services Definitions," August 2014, and MEF 10.3 "Ethernet Services Attributes Phase 3," October 2013, the contents of each is incorporated herein by reference. E-Line is a service type defined by the MEF for connecting exactly two UNIs where those two UNIs can communicate only with one another. The ELINE can be port-based as an Ethernet Private Line (EPL) or Virtual Local Area Network (VLAN) based as an Ethernet Virtual Private Line (EVPL).

Preconfigured ELINE Service

The systems and methods include providing a pre-configured ELINE service 30 in case there are control plane or routing protocol failures in the MPLS network 10 which affect the tunnel 20 and where the data plane is expected to remain operational such that the tunnel 20 can be protected on the same path using proactive characteristics of CFM/iVLLI.

The objective is to provide a sub-50 ms switching time and retain the same data path, with the CFM UP MEP and iVLLI configuration on both service ends using a 3.33 ms Continuity Check Message (CCM) interval. Initially, an ELINE sub-port will be blocked using iVLLI and once there is a failure on control path (control plane or routing protocol failure), and the tunnel 20 is impacted, the CFM service would be down, and iVLLI will unblock the ELINE sub-port. After the ELINE sub-port is unblocked, data traffic would start forwarding through ELINE service 30 path with an approximate traffic hit of less than 50 ms, and this state remains until the control plane recovers. Furthermore, during this state, Access flow will deny CFM PDUs over the ELINE service 30, in other words, restricting the CFM service to come through using the ELINE service 30.

Figure 3:
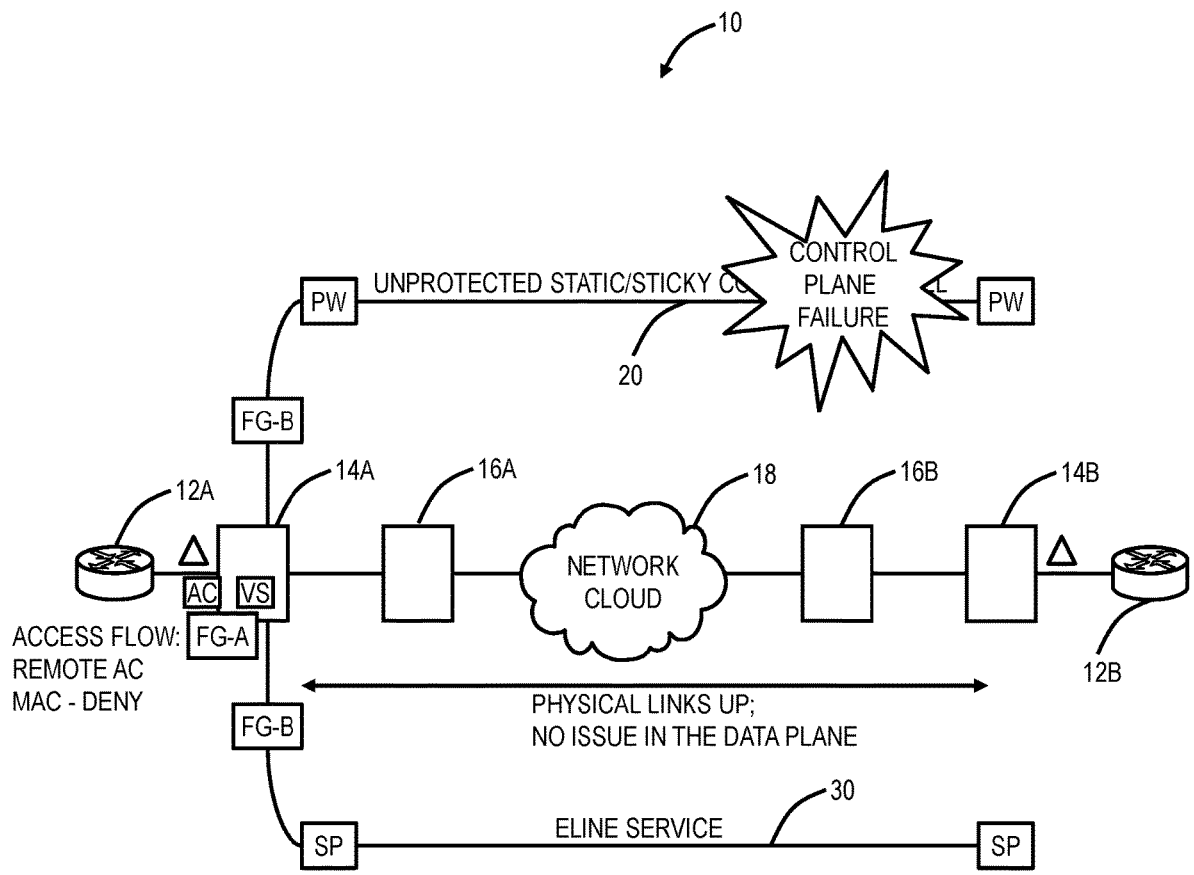
FIG. 3 is a network diagram of the example MPLS network of FIG. 2 with a control plane failure in the MPLS network affecting the tunnel.
Figure 4:
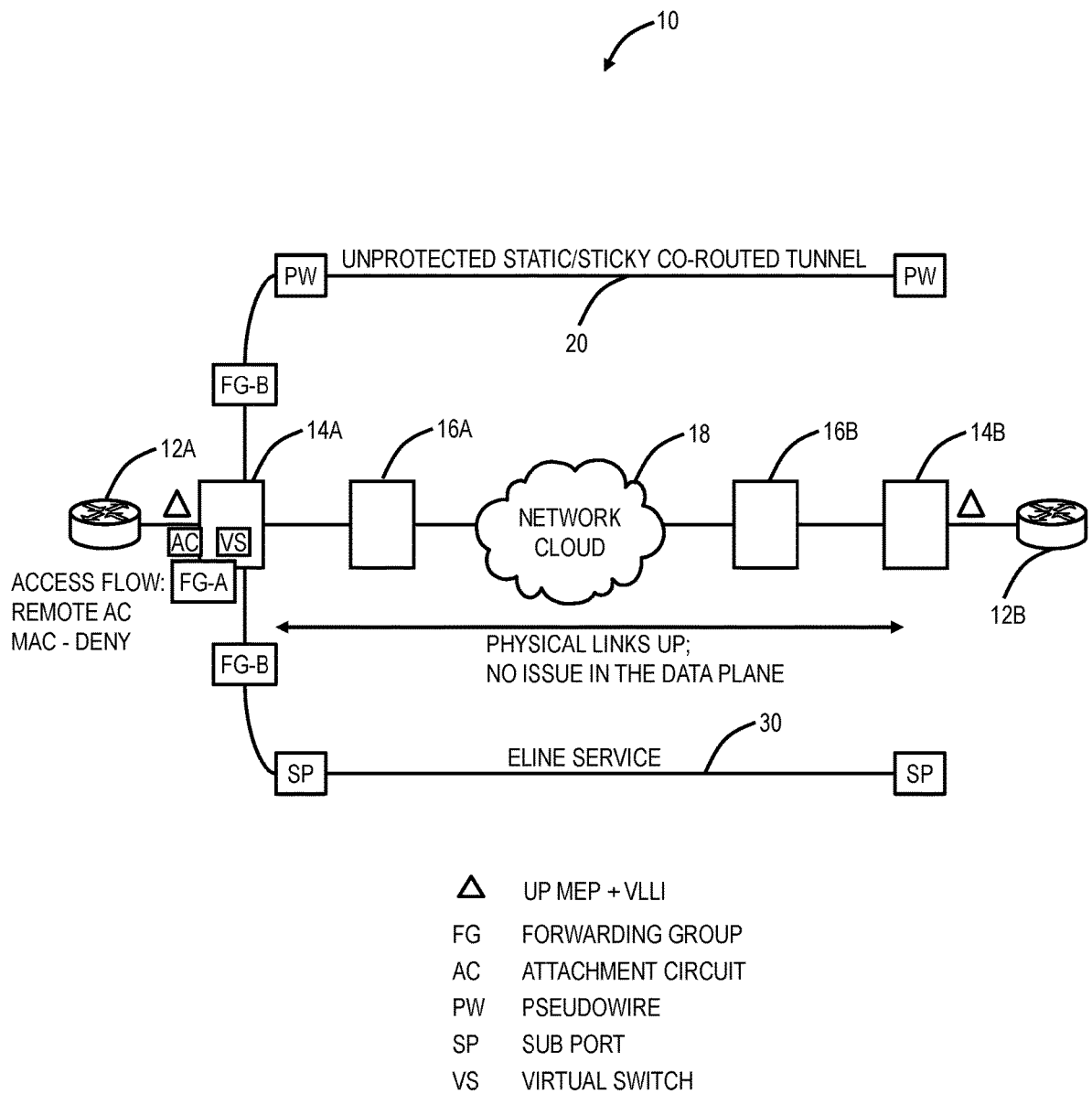
FIG. 4 is a network diagram of the example MPLS network of FIG. 2 with a control plane failure recovery in the MPLS network.

The operation can be classified into three different action stages—an initial stage, a control plane failure, and a control plane recovery. The initial stage is illustrated in FIG. 2 where the tunnel 20 is operational both in the data plane and control plane. The control plane failure stage is illustrated in FIG. 3 and the control plane recovery is illustrated in FIG. 4.

The associated states, UP or DOWN, are as follows for different aspects during each of the three stages:

| Actions | MPLS service | CFM service | ELINE service | Traffic Path |
| --- | --- | --- | --- | --- |
| Initial Stage | UP | UP | DOWN | MPLS |
| Control Plane Failure | DOWN | DOWN | UP | ELINE |
| Control Plane Recovery | UP | UP | DOWN | MPLS |

As soon as a routing failure recovers and the MPLS path comes up, the CFM session will immediately come up and will trigger an iVLLI action, which will block the ELINE sub-port. Due to this, traffic will restart forwarding through the tunnel 20 and all other functions such as MAC learning, will be re-calculated and regain the same state as it had before failure. PFG will prevent any possible loop conditions.

VLLI/iVLLI are capable of performing operations—shut and un-shut on any port, but here two additional operations—block and unblock of sub-ports—are employed which would be similar as RPL block/unblock operation in G.8032.

Thus, the ELINE service 30 can provide an alternate transport medium responsive to a control plane failure in an MPLS environment.

Additional provisioning details are described as follows in the initial stage, a control plane failure, and a control plane recovery.

Initial Stage

In FIG. 2, initially, ingress and egress nodes such as the network elements 14A, 14B are provisioned for the tunnel 20 with either a co-routed static unprotected tunnels or dynamic co-routed tunnels (DCRT) with a sticky option enabled. The CFM UP MEP is created and configured between Attachment Circuit (AC) ports of the ingress and egress node over an MPLS service with, e.g., the alarm priority set to 3. The CFM alarm and reset time are configured at the lowest possible values to minimize traffic hits. The ELINE service 30 is configured end-to-end on the same Label Switched Path as the tunnel 20.

A packet forwarding group is enabled on the service VS at the network elements 14A, 14B (the LERs), where a Network-Network Interface (NNI) ELINE sub-port and PW are a leaf and a UNI as a root to prevent any loop conditions. Then, iVLLI is configured on both LERs using the above CFM session with actions block ELINE sub-port (on CFM up) and unblock the sub-port (on CFM down). The Access flow at the ELINE sub-ports is provisioned to restrict CFM PDUs.

The following table summarizes the configuration in the initial state, i.e., where the control plane and the data plane are both operating normally.

| Control Plane is up | Virtual Switch | CFM | Access Flow | VLLI | | |
|---|---|---|---|---|---|---|
| | Client ELINE NNI-SP | FW-A FW-B | UP MEP SERVICE on AC | DENY Remote AC MAC | Source Destination | CFM ELINE-NNI Sub Port |
| | MPLS PW | FW-B | | | Action-Recovery | Sub-Port Blocked |
| | PW is UP | | CFM UP | DENY | ELINE-NNI Sub Port blocked | |

Data Traffic on MPLS

Control Plane Failure

When a control plane failure occurs (while the data plane is operational), the CFM service goes down as does the tunnel 20. CFM alarm will trigger an iVLLI action to unblock an ELINE NNI sub-port, and the ELINE service 30 will allow data traffic on the same path. The Access Flow will block CFM PDUs on the ELINE service 30 and a CFM defect will persist until the MPLS service is restored. This is required, because if CFM service is alarm free via the ELINE service 30, it will again block the ELINE NNI sub-port.

The following table summarizes the configuration in the control plane failure state, i.e., where the control plane is down, and the data plane is operating normally.

| Control Plane Failure | Virtual Switch | CFM | Access Flow | VLLI | | |
|---|---|---|---|---|---|---|
| | Client ELINE NNI-SP | FW-A FW-B | UP MEP SERVICE on AC | DENY Remote MAC | Source Destination | CFM ELINE-NNI Sub Port |
| | MPLS PW | FW-B | | | Action-Fault | Sub-Port Unblocked |
| | PW is DOWN | | CFM DOWN | DENY (CCM) | ELINE-NNI Sub Port Unblocked | |

Data Traffic on MPLS

Control Plane Recovery

When the control plane failure recovers, the tunnel 20 will come up again as well the CFM service. The receipt of CFM PDUs will trigger an iVLLI action to block the ELINE NNI sub-port, and the data traffic again moves to the tunnel 20.

The following table summarizes the configuration in the control plane recovery state, i.e., where the control plane has recovered, and the data plane is operating normally.

| Control Plane Recovery | Virtual Switch | CFM | Access Flow | VLLI | | |
|---|---|---|---|---|---|---|
| | Client ELINE NNI-SP | FW-A FW-B | UP MEP SERVICE on AC | DENY Remote MAC | Source Destination | CFM ELINE-NNI Sub Port |
| | MPLS PW | FW-B | | | Action-Recovery | Sub-Port Blocked |
| | PW is UP | | CFM UP | DENY | ELINE-NNI Sub Port Blocked | |

Data Traffic on MPLS

Data Path Retention Process During Control Plane Failures

Figure 5:
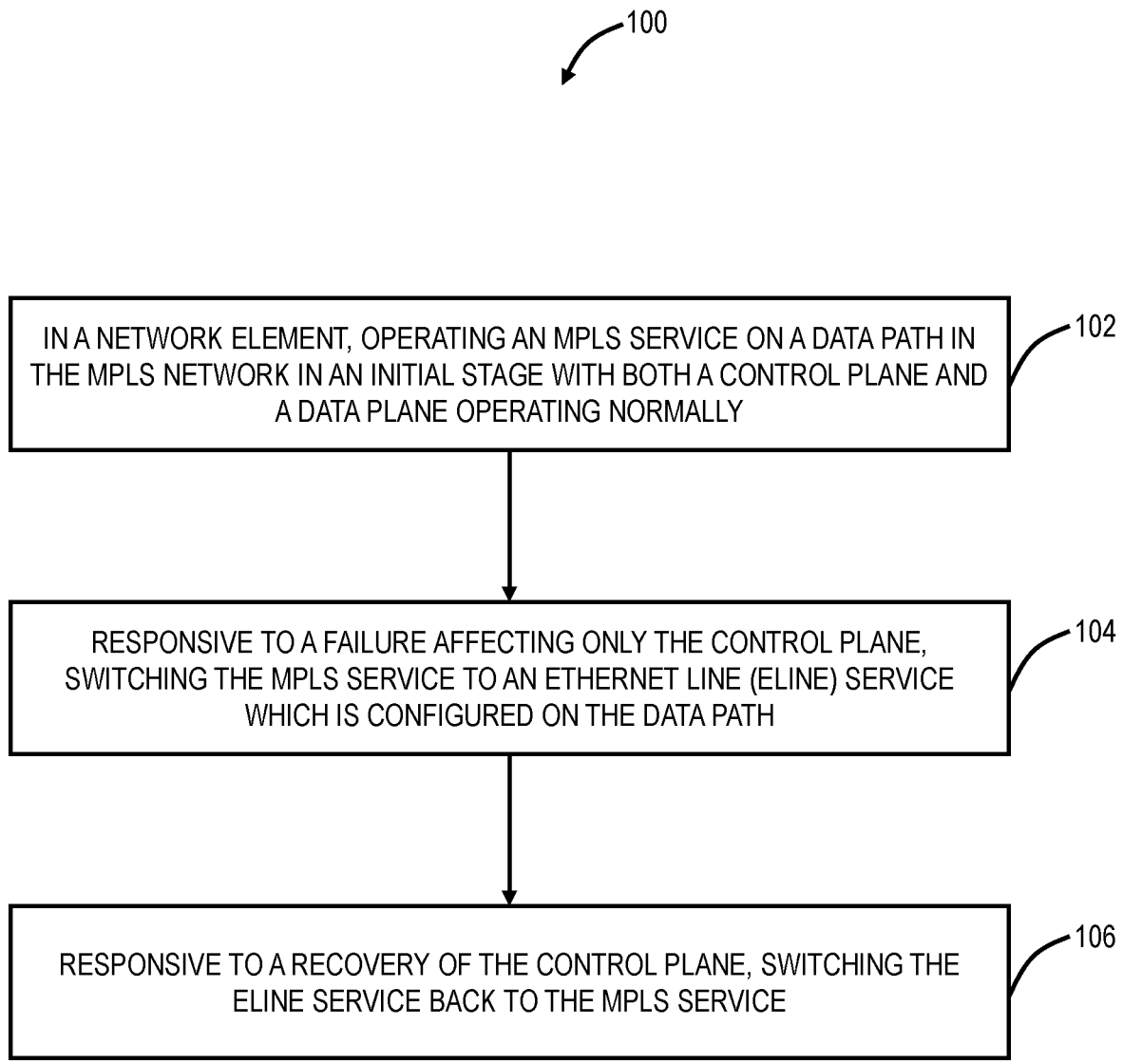
FIG. 5 is a flowchart of a process for data path retention during control plane failures in an MPLS network.

FIG. 5 is a flowchart of a process 100 for data path retention during control plane failures in a Multiprotocol Label Switching (MPLS) network. The process 100 includes, in a network element, operating an MPLS service on a data path in the MPLS network in an initial stage with both a control plane and a data plane operating normally (step 102); responsive to a failure affecting only the control plane, switching the MPLS service to an Ethernet Line (ELINE) service which is configured on the data path (step 104); and, responsive to a recovery of the control plane, switching the ELINE service back to the MPLS service (step 106).

A Connectivity Fault Management (CFM) UP Maintenance End Point (MEP) can be configured between a port of the network element and an associated port of an egress network element at an opposite end of the data path. The network element can be configured to detect the failure based on Continuity Check Messages (CCMs) received on the CFM UP MEP. The CCMs can be blocked on the ELINE service responsive to the failure.

The MPLS service and the ELINE service can be both connected to a Virtual Switch (VS), and associated ports of the VS are blocked and unblocked utilizing Virtual Link Loss Indication (VLLI) and inverse VLLI (iVLLI) based on a state of the control plane. The MPLS service can be one of an unprotected static tunnel and a sticky co-routed tunnel, over the data path which is a Label Switched Path (LSP).

The failure can be due to any of Media Access Control (MAC) resolution failure using Address Resolution Protocol (ARP); a routing protocol convergence/failure in one of Intermediate System-Intermediate System (ISIS) and Open Shortest Path First (OSPF); an Operations, Administration, and Maintenance (OAM) Bidirectional Fault Detection (BFD) failure; a tunnel signaling message failure in one of Resource Reservation Protocol (RSVP) and Constraint-based Routing Label Distribution Protocol (CR-LDP); and a Pseudowire (PW) signaling message failure.

Figure 6:
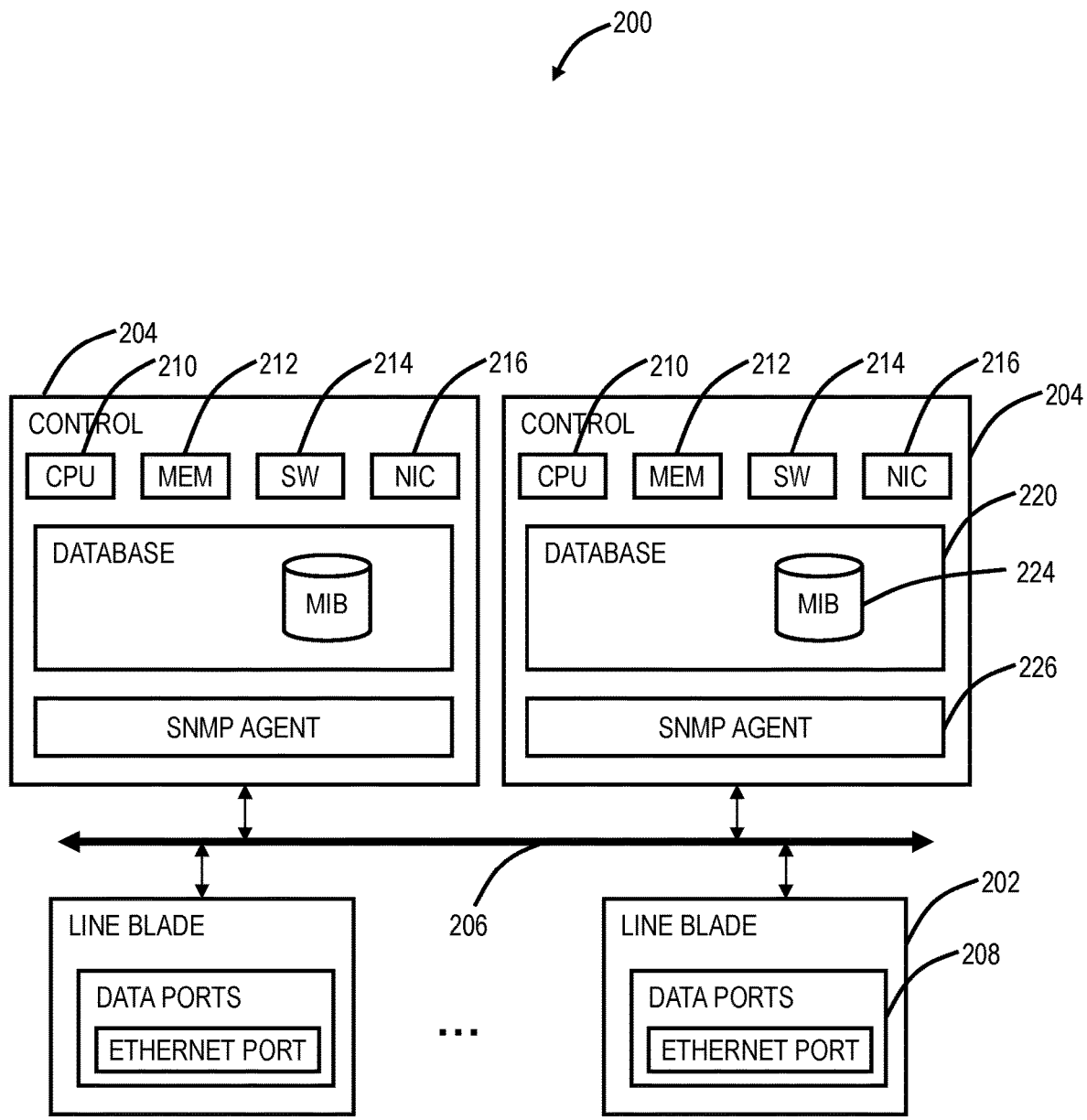
FIG. 6 is a block diagram of an example implementation of a network element in the MPLS network of FIGS. 1-4.

Example Command Line Interface (CLI)
Ingress Node:
    MPLS Service Creation
gmpls tp-tunnel create rsvp-ingress-corout DCRT-node1-to-node2 dest-ip <node2-LB-ip> sticky-lsp on
mpls l2-vpn create dynamic-vc PW_Clnt-1 pw-id x peer <node2-LB-ip> tp-tunnel-ingr-corout DCRT-node1-to-node2
virtual-switch create vs Clnt-1_VS
virtual-switch interface attach mpls-vc PW_Clnt-1 vs Clnt-1_VS
sub-port create sub-port UNI-SP_Clnt-1 parent-port 7/12-1000 classifier-precedence 1 vtag-stack VID
virtual-switch interface attach sub-port UNI-SP_Clnt-1 vs Clnt-1_VS
    Pre-Configured ELINE Service
sub-port create sub-port NNI-SP_Clnt-1 parent-port NNI-PORT classifier-precedence 1 vtag-stack VID private-forwarding-group B
virtual-switch interface attach sub-port NNI-SP_Clnt-1 vs Clnt-1_VS
private-forwarding-group enable vs Clnt-1_VS
    CFM/iVLLI Configuration
cfm service create vs Clnt-1_VS ccm-interval 3.33 ms alarm-time 0 reset-time 100 alarm-priority 3
cfm service enable service Clnt-1_VS
cfm mep create service Clnt-1_VS sub-port UNI-SP_Clnt-1 type up mepid 1
virtual-link-loss-indication create action-group iVLLI_SP_block-unblock
virtual-link-loss-indication add action-group iVLLI_SP_block-unblock type fault action sub-port-unblock precedence 1
virtual-link-loss-indication add action-group iVLLI_SP_block-unblock type recovery action sub-port-block precedence 1
virtual-link-loss-indication create instance-group iVLLI_instGrp direction unidirectional
virtual-link-loss-indication add instance-group iVLLI_instGrp cfm-instance Clnt-1_VS mode source
virtual-link-loss-indication add instance-group iVLLI_instGrp port-instance NNI-SUB-PORT(ELINE) mode destination action-group iVLLI_SP_block-unblock
virtual-link-loss-indication enable instance-group iVLLI_instGrp
    Access Flow to Block Ccm Pdus on ELINE Service
access-flow create access-flow AF parent-sub-port NNI-SP_Clnt-1 classifier-precedence 1
access-flow add access-flow AF class-element 1 c-mac-sa REMOTE-UNI-MAC Egress Node:
    MPLS Service Creation
mpls l2-vpn create dynamic-vc PW_Clnt-1 pw-id x peer <node1-LB-ip> tp-tunnel-egrs-corout-dynamic DCRT-ottawa-to-perth
virtual-switch create vs Clnt-1_VS
virtual-switch interface attach mpls-vc PW_Clnt-1 vs Clnt-1_VS
sub-port create sub-port UNI-SP_Clnt-1 parent-port 12/6-3000 classifier-precedence 1 vtag-stack VID
virtual-switch interface attach sub-port UNI-SP_Clnt-1 vs Clnt-1_VS
    Pre-Configured ELINE Service
sub-port create sub-port NNI-SP_Clnt-1 parent-port NNI-PORT classifier-precedence 1 vtag-stack VID private-forwarding-group B
virtual-switch interface attach sub-port NNI-SP_Clnt-1 vs Clnt-1_VS
private-forwarding-group enable vs Clnt-1_VS
    CFM/iVLLI Configuration
cfm service create vs Clnt-1_VS ccm-interval 3.33 ms alarm-time 0 reset-time 100 alarm-priority
cfm service enable service Clnt-1_VS
cfm mep create service Clnt-1_VS sub-port UNI-SP_Clnt-1 type up mepid 2
virtual-link-loss-indication create action-group iVLLI_SP_block-unblock
virtual-link-loss-indication add action-group iVLLI_SP_block-unblock type fault action sub-port-unblock precedence 1
virtual-link-loss-indication add action-group iVLLI_SP_block-unblock type recovery action sub-port-block precedence 1
virtual-link-loss-indication create instance-group iVLLI_instGrp direction unidirectional
virtual-link-loss-indication add instance-group iVLLI_instGrp cfm-instance Clnt-1_VS mode source
virtual-link-loss-indication add instance-group iVLLI_instGrp port-instance NNI-SUB-PORT(ELINE) mode destination action-group iVLLI_SP_block-unblock
virtual-link-loss-indication enable instance-group iVLLI_instGrp
    Access Flow to Block ccm pdus on ELINE Service
access-flow create access-flow AF parent-sub-port NNI-SP_Clnt-1 classifier-precedence 1 access-flow add access-flow AF class-element 1 c-mac-sa REMOTE-UNI-MAC
Network Element FIG. 6 is a block diagram of an example implementation of a network element 14, 16. The network element 14, 16 can be an Ethernet network switch for illustration purposes, but those of ordinary skill in the art will recognize the systems and methods described herein contemplate other types of network elements and other implementations. In this embodiment, the network element 14, 16 includes a plurality of blades 202, 204 interconnected via an interface 206. The blades 202, 204 are also known as line cards, line modules, circuit packs, pluggable modules, etc., and generally refer to components mounted within a chassis, shelf, etc. of a data switching device, i.e., the network element 14, 16. Each of the blades 202, 204 may include numerous electronic devices and/or optical devices mounted on a circuit board along with various interconnects including interfaces to the chassis, shelf, etc. Two example blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 14, 16 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222 which may include CFM objects. Further, the control blades 204 may include a Simple Network Management Protocol (SNMP) Agent 226 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200.

Note, as described herein, the network element 14, 16 is a physical network device. In other embodiments, the systems and methods described herein also contemplate operation with virtual devices performing network functions, such as Virtual Network Functions (VNFs) and the like. The virtual devices can provide similar functionality as the network element 14, 16 but are realized in a virtualized environment such as operating on compute resources on a Virtual Machine (VM), software container, etc. Network operators are expanding Network Functions Virtualization (NFV) deployments, and it is expected OAM sessions will be required for both physical network elements 14, 16 and virtual VNFs.

The network element 14 can be configured for data path retention during control plane failures in the MPLS network 10. Again, the network element 14 includes one or more line modules 202 with associated ports 208; a switching fabric interconnecting the associated ports 208; and a controller 204 communicatively coupled to the one or more line modules and the switching fabric, wherein an MPLS service 20 is operated on a data path via a port connected to the MPLS network 10 in an initial stage with both a control plane and a data plane operating normally, responsive to a failure affecting only the control plane, the MPLS service 10 is switched to an Ethernet Line (ELINE) service 30 which is configured on the data path, and, responsive to a recovery of the control plane, the ELINE service 30 is switched back to the MPLS service 10.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for data path retention during control plane failures in a Multiprotocol Label Switching (MPLS) network, the method comprising:
   in a network element, operating an MPLS service on a data path in the MPLS network in an initial stage with both a control plane and a data plane operating normally;
   responsive to a failure affecting only the control plane where the data plane remains operational, switching the MPLS service to an Ethernet Line (ELINE) service which is configured on the data path that is a same path as the MPLS service, the ELINE service being pre-configured to protect a tunnel of the MPLS service over the same path, wherein the MPLS service and the ELINE service are both connected to a Virtual Switch (VS) and associated ports of the VS are blocked and unblocked utilizing Virtual Link Loss Indication (VLLI) and inverse VLLI (iVLLI) based on a state of the control plane; and
   responsive to a recovery of the control plane, switching the ELINE service back to the MPLS service.

2. The method of claim 1, wherein a Connectivity Fault Management (CFM) UP Maintenance End Point (MEP) is configured between a port of the network element and an associated port of an egress network element at an opposite end of the data path.

3. The method of claim 2, wherein the network element is configured to detect the failure based on Continuity Check Messages (CCMs) received on the CFM UP MEP.

4. The method of claim 3, wherein the CCMs are blocked on the ELINE service, utilizing an Access flow, responsive to the failure.

5. The method of claim 1, wherein the MPLS service is one of an unprotected static tunnel and a sticky co-routed tunnel, over the data path which is a Label Switched Path (LSP).

6. The method of claim 1, wherein the failure is due to any of Media Access Control (MAC) resolution using Address Resolution Protocol (ARP); a routing protocol convergence/failure in one of Intermediate System-Intermediate System (ISIS) and Open Shortest Path First (OSPF); an Operations, Administration, and Maintenance (OAM) Bidirectional Fault Detection (BFD) failure; a tunnel signaling message failure in one of Resource Reservation Protocol (RSVP) and Constraint-based Routing Label Distribution Protocol (CR-LDP); and a Pseudowire (PW) signaling message failure.

7. A network element configured for data path retention during control plane failures in a Multiprotocol Label Switching (MPLS) network, the network element comprising:
   one or more line modules with associated ports;
   a switching fabric interconnecting the associated ports; and
   a controller communicatively coupled to the one or more line modules and the switching fabric, wherein the controller is configured to:
   operate an MPLS service on a data path via a port of the associated ports connected to the MPLS network in an initial stage with both a control plane and a data plane operating normally, responsive to a failure affecting only the control plane where the data plane remains operational, switch the MPLS service to an Ethernet Line (ELINE) service which is configured on the data path that is a same path as the MPLS service, the ELINE service being pre-configured to protect a tunnel of the MPLS service over the same path, wherein the MPLS service and the ELINE service are both connected to a Virtual Switch (VS) and associated ports of the VS are blocked and unblocked utilizing Virtual Link Loss Indication (VLLI) and inverse VLLI (iVLLI) based on a state of the control plane, and
   responsive to a recovery of the control plane, switch the ELINE service back to the MPLS service.

8. The network element of claim 7, wherein a Connectivity Fault Management (CFM) UP Maintenance End Point (MEP) is configured between a port of the network element and an associated port of an egress network element at an opposite end of the data path.

9. The network element of claim 8, wherein the network element is configured to detect the failure based on Continuity Check Messages (CCMs) received on the CFM UP MEP.

10. The network element of claim 9, wherein the CCMs are blocked on the ELINE service, utilizing an Access flow, responsive to the failure.

11. The network element of claim 7, wherein the MPLS service is one of an unprotected static tunnel and a sticky co-routed tunnel, over the data path which is a Label Switched Path (LSP).

12. The network element of claim 7, wherein the failure is due to any of Media Access Control (MAC) resolution using Address Resolution Protocol (ARP); a routing protocol convergence/failure in one of Intermediate System-Intermediate System (ISIS) and Open Shortest Path First (OSPF); an Operations, Administration, and Maintenance (OAM) Bidirectional Fault Detection (BFD) failure; a tunnel signaling message failure in one of Resource Reservation Protocol (RSVP) and Constraint-based Routing Label Distribution Protocol (CR-LDP); and a Pseudowire (PW) signaling message failure.

13. A Multiprotocol Label Switching (MPLS) network configured for data path retention during control plane failure, the MPLS network comprising:
   a plurality of physical network elements interconnected to one another, including a data path; and an MPLS service,
   wherein the MPLS service is configured between two Label Edge Routers (LERs) of the plurality of physical network elements via the data path and the MPLS service is in an initial stage with both a control plane and a data plane operating normally,
   wherein, responsive to a failure affecting only the control plane where the data plane remains operational, the MPLS service is switched to an Ethernet Line (ELINE) service which is configured on the data path that is a same path as the MPLS service, the ELINE service being pre-configured to protect a tunnel of the MPLS service over the same path wherein the MPLS service and the ELINE service are both connected to a Virtual Switch (VS) and associated ports of the VS are blocked and unblocked utilizing Virtual Link Loss Indication (VLLI) and inverse VLLI (iVLLI) based on a state of the control plane, and wherein, responsive to a recovery of the control plane, the ELINE service is switched back to the MPLS service.

14. The MPLS network of claim 13, wherein a Connectivity Fault Management (CFM) UP Maintenance End Point (MEP) is configured between a port of a network element of the plurality of physical network elements and an associated port of an egress network element at an opposite end of the data path.

15. The MPLS network of claim 14, wherein the network element is configured to detect the failure based on Continuity Check Messages (CCMs) received on the CFM UP MEP.

16. The MPLS network of claim 15, wherein the CCMs are blocked on the ELINE service, utilizing an Access flow, responsive to the failure.

17. The MPLS network of claim 13, wherein the MPLS service is one of an unprotected static tunnel and a sticky co-routed tunnel, over the data path which is a Label Switched Path (LSP).

\* \* \* \* \*